(12) United States Patent
Truong et al.

(10) Patent No.: US 7,558,192 B1
(45) Date of Patent: Jul. 7, 2009

(54) METHOD TO INCREASE SYSTEM AVAILABILITY OF CRITICAL HARDWARE COMPONENTS

(75) Inventors: Alex Van Truong, San Jose, CA (US); David Lai, Mountain View, CA (US); Tien D. Tran, Fountain Valley, CA (US); Hiep Le, Atherton, CA (US); Eugene Wang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 850 days.

(21) Appl. No.: 10/838,662

(22) Filed: May 3, 2004

(51) Int. Cl.
*G01R 31/08* (2006.01)
*G06F 11/00* (2006.01)

(52) U.S. Cl. .............. 370/216; 370/242; 714/2; 714/25

(58) Field of Classification Search .......... 370/216–221, 370/225, 228, 241–244, 445, 447, 449, 450; 714/2, 11, 25, 39; 340/3.1, 3.43
See application file for complete search history.

(56) References Cited

U.S. PATENT DOCUMENTS

| | | | | |
|---|---|---|---|---|
| 4,939,747 A * | 7/1990 | Adler | ............... | 370/243 |
| 5,437,059 A * | 7/1995 | Murakami et al. | ............... | 455/503 |
| 6,128,555 A * | 10/2000 | Hanson et al. | ............... | 701/13 |
| 6,236,332 B1 * | 5/2001 | Conkright et al. | ............... | 340/3.1 |
| 6,868,067 B2 * | 3/2005 | Rostron | ............... | 370/241 |
| 6,934,247 B2 * | 8/2005 | Bhattal et al. | ............... | 370/216 |
| 7,180,867 B2 * | 2/2007 | Hoch et al. | ............... | 370/244 |
| 7,286,467 B1 * | 10/2007 | Sylvain | ............... | 370/216 |
| 7,349,328 B2 * | 3/2008 | Watanabe | ............... | 370/218 |
| 2003/0023892 A1 * | 1/2003 | Giovanni | ............... | 714/2 |
| 2003/0112746 A1 * | 6/2003 | Schaller et al. | ............... | 370/216 |
| 2003/0198180 A1 * | 10/2003 | Cambron | ............... | 370/216 |
| 2004/0158777 A1 * | 8/2004 | Bae et al. | ............... | 714/47 |

* cited by examiner

*Primary Examiner*—Aung S Moe
*Assistant Examiner*—Kerri M Rose
(74) *Attorney, Agent, or Firm*—Stolowitz Ford Cowger LLP

(57) ABSTRACT

One embodiment of the invention includes a system for overriding an operation of an electronic device. The system includes an override hardware logic that is communicatively coupled with a monitoring system. The monitoring system can output an electronic command signal in response to a detected point of failure associated with the system. In response to receiving the electronic command signal, the override hardware logic can override the operation performed by the electronic device in order to compensate for the detected point of failure.

30 Claims, 6 Drawing Sheets

000
METHOD TO INCREASE SYSTEM AVAILABILITY OF CRITICAL HARDWARE COMPONENTS

BACKGROUND

Some computer networking environments can include routers and switches that forward data and information between different computers and networks. However, there can be disadvantages associated with routers and switches within networking environments. For example, if a router or a switch experiences a point of failure, or failure of one or more of its critical components, a portion of the network associated with that device may become inoperative and typically remains that way until a technician arrives and repairs the disabled device. This problem can be further exacerbated when the disabled router or switch is deployed in a remote area that is not staffed with any personnel thereby resulting in additional downtime while a technician travels to the remote area.

Even when the router or switch is deployed in a local area that is staffed with personnel, the inoperative portion of the network can still experience extended downtime. For example, the downtime can be prolonged when replacement hardware needed for repairing the disabled device is not located onsite and as such needs to be shipped in from a remote location.

The present invention may address one or more of the above issues.

SUMMARY

One embodiment of the invention includes a system for overriding an operation of an electronic device. The system can include an override hardware logic that is communicatively coupled with a monitoring system. The monitoring system can output an electronic command signal in response to a detected point of failure associated with the system. In response to receiving the electronic command signal, the override hardware logic can override the operation performed by the electronic device in order to compensate for the detected point of failure.

In another embodiment, the invention provides a method for overriding an operation of an electronic device. For example, the method can include detecting a problem associated with the electronic device. Also, the method can include activating an override hardware logic associated with the electronic device, in response to the detecting of the problem. Additionally, the method can include overriding the operation of the electronic device with the override hardware logic to compensate for the problem associated with the electronic device, in response to the activating the override hardware logic.

In yet another embodiment, the invention provides an electronic device readable medium having readable code embodied therein for causing a system to perform a method. The method can include detecting a point of failure associated with an electronic device. Furthermore, the method can include activating an override hardware logic associated with the electronic device, in response to the detecting of the point of failure. Moreover, the method can include directing the override hardware logic to override an operation of the electronic device to compensate for the point of failure associated with the electronic device, in response to the activating of the override hardware logic.

In still another embodiment, the invention provides a system for overriding an operation of an electronic device. The system can include means for detecting a point of failure associated with an electronic device. Furthermore, the system can include means for activating an override logic associated with the electronic device, in response to detecting the point of failure. Additionally, the system can include means for directing the override logic to override the operation of the electronic device to compensate for the point of failure associated with the electronic device.

While particular embodiments of the invention have been specifically described within this summary, it is noted that the invention is not limited to these embodiments. The invention is intended to cover alternatives, modifications and equivalents which may be included within the scope of the invention as defined by the Claims.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions which follow are presented in terms of procedures, logic blocks, processing, and other symbolic representations of operations on data bits within a computing system or electronic circuitry. These descriptions and representations are the means used by those skilled in the data processing arts to convey the substance of their work to others skilled in the art. A procedure, logic block, process, etc., is herein, and generally, conceived to be a self-consistent sequence of operations or instructions leading to a desired result. The operations may involve physical manipulations of physical quantities. Usually, though not necessarily, these physical manipulations take the form of electrical or magnetic signals capable of being stored, transferred, combined, compared, and otherwise manipulated in a computing system or electronic circuitry.

Unless specifically stated otherwise as apparent from the following discussions, it is understood that throughout discussions of embodiments in accordance with the invention, discussions utilizing terms such as "detecting", "activating", "sending", "notifying", "suppressing", "receiving", "directing", "overriding", "overwriting", "ascertaining", "determining", "monitoring", "controlling", "transmitting", "generating", "utilizing", "causing", "directing" or the like, can refer to the action and processes of, but is not limited to, a computing device, software, and/or electronic hardware.

Figure 1:
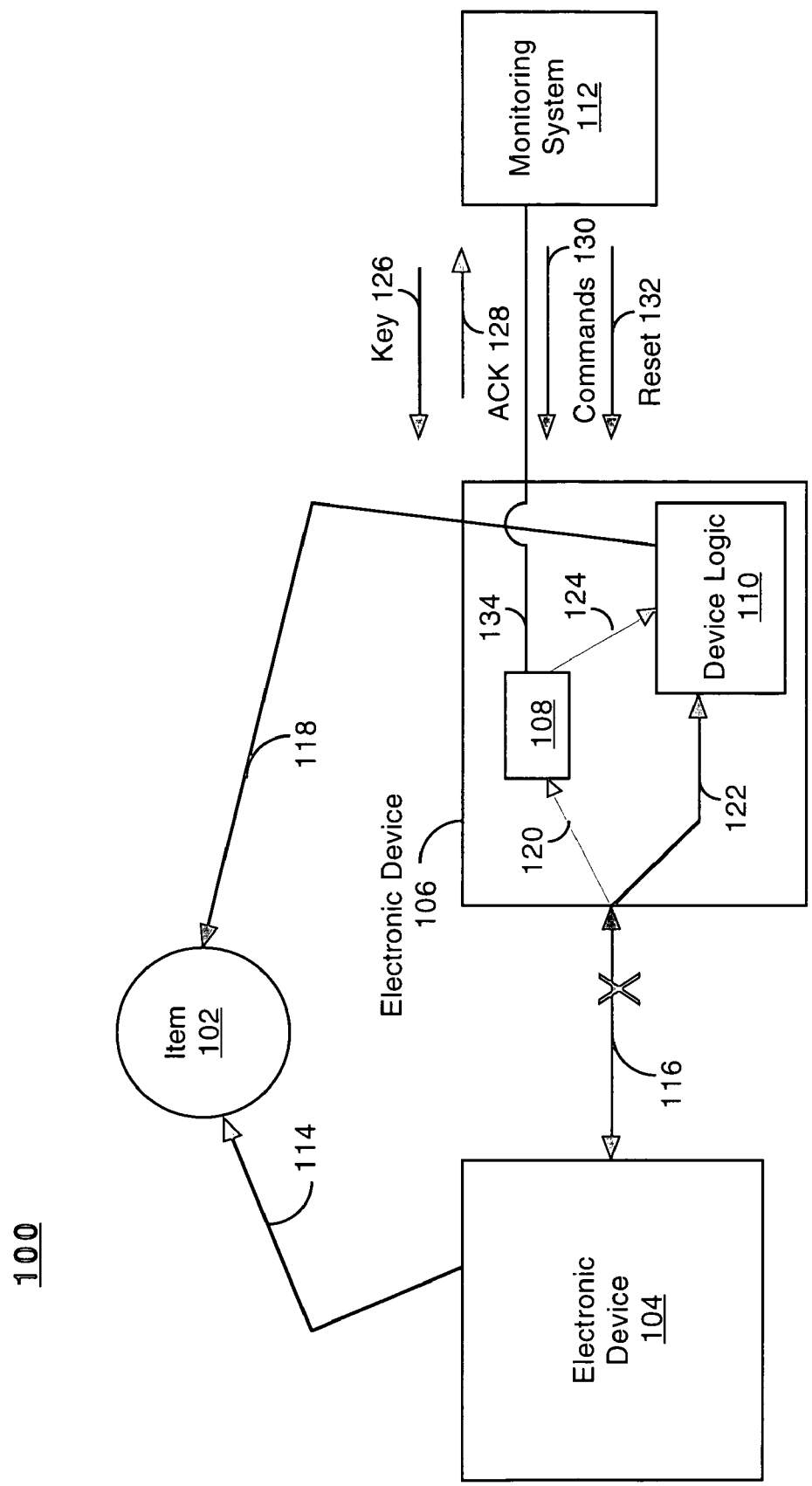
FIG. 1 is a block diagram of an exemplary system in accordance with an embodiment of the invention that enables an electronic device to be controlled in response to an operational failure associated with the system.

FIG. 1 is a block diagram of an exemplary system 100 in accordance with an embodiment of the invention that enables an electronic device (e.g., 106) to be controlled in response to an operational failure associated with system 100. Specifically, when a point of failure or problem occurs within system 100, an electronic device (e.g., 106) may be remotely controlled in order to respond in some manner to that point of failure and thereby enable system 100 to continue operating. As such, the present embodiment dramatically decreases the mean time to recover of system 100 and thus increases availability of system 100 without requiring a person (or technician) to be onsite to resolve the problem. This is especially useful when the disabled equipment (or device) is located at a remote site that is not staffed with any personnel, or in the situation where no spare replacement hardware exists on site and needs to be shipped in from some remote location.

It is noted that electronic devices 104 and 106 can each be implemented as, but is not limited to, a processor card (e.g., 602 of FIG. 6) of a network switch or router (e.g., 600), a line card (e.g., 604, 606 or 608) of a network switch or router, an application-specific integrated circuit (ASIC) of a processor card or line card of a network switch or router, an integrated circuit (IC) of a processor card or line card of a network switch or router, a field-programmable gate array (FPGA) of a processor card or line card of a network switch or router, or any type of electronic device.

In normal operations, system 100 includes an item 102 that can be accessed separately by the electronic devices 104 and 106. Alternatively, electronic devices 104 and 106 can each transmit one or more output signals that are read (or consumed) by item 102. However, in order to avoid having both electronic devices 104 and 106 communicating with item 102 concurrently (or simultaneously), they communicate with each other via a bi-directional communication coupling 116. For example, if the electronic device 104 desires to communicate with item 102, it can transmit via the communication coupling 116 a continuous access signal (e.g., logical high voltage signal) to the electronic device 106 indicating such. As such, the electronic device 106 will not try to communicate with item 102 while receiving the continuous access signal. Once the electronic device 104 has completed communicating with item 102, the electronic device 104 can then transmit via the coupling 116 a continuous release signal (e.g., logical low voltage signal) to the electronic device 106 indicating such. Therefore, the electronic device 106 may now communicate with item 102 if desired. It is understood that before the electronic device 106 communicates with item 102, it can transmit via the coupling 116 the continuous access signal (e.g., logical high voltage signal) to the electronic device 104 indicating such. It is noted that the electronic devices 104 and 106 may each be implemented to include electronic hardware or a combination of hardware and software.

Within FIG. 1, it is noted that one or more points of failure (or problems) may occur within system 100 such as, but not limited to, the bi-directional communication coupling 116 becoming inoperative as indicated by the "X". Consequently, the electronic devices 104 and 106 are unable to communicate. Moreover, the electronic devices 104 and 106 may each be receiving a logical low voltage signal from the inoperative communication coupling 116 thereby leading each to "believe" it is receiving a release signal from the other device. As such, without using override logic 108, this situation can disadvantageously result in both electronic devices 104 and 106 communicating with item 102 simultaneously (or concurrently) thereby compromising the integrity of the system 100.

In order to respond to one or more points of failure within system 100, each point of failure is first detected. As part of detecting one or more points of failure, it can be desirable to determine the root cause of each point of failure (or problem). The detection of each point of failure can be performed in a wide variety of ways. For example, the electronic devices 104 and 106 can each be implemented to automatically detect any point of failure that is associated with each device and report it in a timely manner to an optional monitoring system 112. Alternatively, the monitoring system 112 may periodically and automatically query the electronic devices 104 and 106 which can each be implemented to automatically detect and report any point of failure associated with each device. In another embodiment, if the system 100 is not operating properly and item 102 and the electronic devices 104 and 106 have not been implemented to detect and/or report points of failure, the monitoring system 112 can be implemented to automatically (or manually by a person) run individual operational tests on item 102 and electronic devices 104 and 106. In this manner, the monitoring system 112 can test each input, output and/or other components of item 102 and the electronic devices 104 and 106 to determine where any point of failure is located that is adversely affecting system 100. System 100 can be implemented with multiple monitoring systems (e.g., 112) as described herein. It is noted that the present embodiment is not limited in the manner that it detects any point of failure (or operational problem).

An exemplary point of failure within FIG. 1 can be, but is not limited to, the bi-directional communication coupling 116 that has become inoperative (as indicated by the "X") for some unknown reason. Once any point of failure has been detected within system 100, a determination can be made automatically (or manually by a person) as to whether any override logic (e.g., 108) exists within the system 100 that can be activated to compensate for (or work-around) the detected point of failure. Within system 100, this determination can be performed by, but is not limited to, the monitoring system 112, electronic device 104, electronic device 106, item 102, and/or the override logic 108. If it is determined that there is no override logic that can compensate for the detected point of failure, a technician can be subsequently sent out to correct (or repair) the point of failure. However, if it is determined that there is override logic (e.g., 108) within system 100 that can compensate (or provide a work-around) for the detected point of failure, that override logic can then be activated.

For example, given that override hardware logic 108 of system 100 can compensate (or provide a work-around) for the inoperative bi-directional communication coupling 116, the monitoring system 112 can automatically (or manually activated to) transmit an electronic key 126 to the override logic 108 via coupling 134 in order to initiate its activation. The electronic key 126 can be implemented in a wide variety of ways. For example, the electronic key 126 can include one or more electronic keys. Moreover, the electronic key 126 can include a defined number of electronic keys transmitted to the override logic 108 at defined time intervals in order to activate it. Furthermore, the electronic key 126 can include different electronic keys that can activate different functionality or different regions of the override hardware logic 108. Specifically, the override logic 108 can include one or more functions (or portions) that can each be activated by one or more electronic keys 126 and utilized for responding to problems and/or functional failures of system 100. The electronic key 126 can be implemented with any type of electronic code sequence and/or encryption. It is noted that by utilizing electronic key 126 to initiate the activation of the override logic 108, there is less chance of the override logic 108 being accidentally activated.

Within FIG. 1, upon reception of the electronic key 126, the override logic 108 may optionally transmit an electronic acknowledge (ACK) signal 128 to the monitoring system 112 via coupling 134 indicating it has received key 126. After receiving the acknowledge signal 128, the monitoring system 112 can automatically (or manually be activated by a person to) transmit one or more electronic commands 130 to the override logic 108 via coupling 134 directing it to perform one or more functions (or operations) to compensate or provide a work-around for the inoperative communication coupling 116. For instance, the commands 130 may direct the override logic 108 to cause the device logic 110 (of the electronic device 106) to "believe" that the electronic device 104 is outputting a continuous access signal (e.g., logical high voltage signal) indicating that it is communicating with item 102. As such, the device logic 110 of electronic device 106 is artificially suppressed from trying to communicate with item 102 while allowing the electronic device 104 to communicate with item 102 as desired. Therefore, the electronic devices 104 and 106 are restricted from communicating with item 102 simultaneously (or concurrently).

Specifically, the commands 130 can direct the override logic 108 to divert via coupling 120 any incoming signal output by the bi-directional communication coupling 116 away from both coupling 122 and device logic 110. Additionally, the commands 130 can also cause the override logic 108 to continuously output a signal (e.g., logical high voltage) to the device logic 110 via coupling 124. In this manner, the override logic 108 can imitate the continuous access signal the device logic 110 would receive if the electronic device 104 was communicating with item 102. Consequently, the electronic device 106 does not try to communicate with item 102 via coupling 118. It is noted that within this situation, the electronic device 106 is restricted from operating in its "normal" manner. However, system 100 is able to maintain its operational integrity until a technician (or person) is able to locate and fix the point of failure (or problem) associated the inoperative bi-directional communication coupling 116.

Within FIG. 1, it is noted that based on the name, identity, or type of electronic key 126 received by override logic 108, it may implicitly understand what it should expect or how many commands 130 it should be expecting. For example, one type of electronic key 126 may open a lock of override logic 108, indicate to override logic 108 to except one specific command 130, and direct it to then close the lock after receiving that command thereby restricting override logic 108 from receiving any other commands without receiving a new key 126. In this manner, override logic 108 is protected from accidentally receiving rogue commands and/or signals that may detrimentally affect its operation.

Monitoring system 112 can be implemented to send electronic key(s) 126 and command(s) 130 together to override logic 108 thereby providing even more protection to override logic 108. For example, override logic 108 would be implemented to receive electronic key(s) 126 followed by the implicit command(s) 130 that corresponds to that key(s). Within this example, the electronic key 126 can open one or more locks of override logic 108, then command(s) 130 can direct the override logic 108 to close the lock(s) along with perform one or more operations.

Within FIG. 1, a determination can be made automatically (or manually by a person) as to whether or not to have the override logic 108 continue performing the operations (or functions) associated with commands 130. In the exemplary situation where the bi-directional communication coupling 116 remains inoperative, the determination may result in having the override hardware logic 108 continue to perform as described herein. However, if it is determined that the point of failure no longer exists (e.g., a technician or person repaired it), the monitoring system 112 may transmit one or more reset signals 132 to the override hardware logic 108 via coupling 134 causing it to become inactive or dormant. Therefore, within the system 100 example, as part of its shutdown procedure, the override logic 108 can cause the bi-directional communication coupling 116 to be coupled with device logic 110 via coupling 122 while deactivating couplings 120 and 124. Consequently, system 100 is able to operate in its "normal" manner.

Within system 100, it is appreciated that the "X" on the bi-directional communication coupling 116 is not limited to indicating that coupling 116 is inoperative. For instance, the "X" on the bi-directional communication coupling 116 can instead indicate that electronic devices 104 and 106 are not communicating properly. For example, an output of electronic device 104 onto coupling 116 may be broken thereby adversely affecting communication with electronic device 106. Alternatively, electronic device 104 could be malfunctioning and outputting nonsensical signals to electronic device 106 via coupling 116. Within either of these embodiments, override logic 108 can provide a work-around in a manner similar to that described herein with regard to the inoperative communication coupling 116, but is not limited to such.

It is noted that the override logic 108 and optionally the monitoring system 112 may be useful within a redundant environment where, for example, the electronic device 104 can be a primary device while the electronic device 106 can be a backup device. Within this type of environment, the electronic devices 104 and 106 can communicate with each other (e.g., as described herein) to determine which one should be the active device. Alternatively, a third party device may communicate with the electronic devices 104 and/or 106 to indicate which one is the active device. However, if there is a point of failure involving which electronic device (e.g., 104 or 106) is the active device, the override logic 108 and optionally the monitoring system 112 can be implemented to compensate for (or work-around) this problem. It is understood that if the override logic 108 is not implemented as part of system 100 and there is a point of failure involving which electronic device (e.g., 104 or 106) is the active device, at least two different disadvantageous situations may occur. For example, both electronic devices 104 and 106 may become active resulting in both communicating with item 102 simultaneously (or concurrently) thereby compromising the integrity of system 100. Alternatively, both electronic devices 104 and 106 may become inactive (or shutdown) if each "thinks" the other device is the active device thereby resulting in system 100 essentially locking up or substantially doing nothing. As such, the override logic 108 and optionally the monitoring system 112 can be implemented as part of a redundant environment to prevent these type of problems from occurring.

Within FIG. 1, it is further noted that the override logic 108 and optionally the monitoring system 112 may be useful in avoiding the recall of equipment that they are associated with. For example, if the electronic device 106 has some operations that become undesirable over time, depending on the implemented functionality of the override logic 108, it can be activated thereby causing electronic device 106 to operate in a particular manner that may be more harmonious with an "evolved" behavior of system 100. As such, the utilization of the override logic 108 may help its associated electronic device (e.g., 106) avoid being totally or partially recalled.

The override logic 108 (and optionally the monitoring system 112) may be useful even when the electronic device (e.g., 106) it is associated with has an extremely low failure rate. For example, sometimes a customer for a very reliable electronic device (e.g., 106) may not be interested in purchasing it if it does not include "work-arounds" for particular functions. Therefore, an electronic device (e.g., 106) implemented with one or more override hardware logic similar to override logic 108 may be made more desirable to customers of the electronic device.

The override hardware logic 108 of FIG. 1 can be applied to any electronic environment where it is desirable to override (or change) an electronic device's "normal" operating functionality via hardware. For example, the override hardware logic 108 may be implemented to override one or more input pins and/or output pins of an electronic device (e.g., 106). Additionally, the override logic 108 can be implemented to modifying one or more bits anywhere within circuitry, such as, an integrated circuit (IC) chip. In this manner, the override logic 108 can change or alter the operations of the electronic device (e.g., 106) in a straightforward fashion. Also, the override logic 108 may be implemented with the functionality to shutdown its associated electronic device (e.g., 106). Moreover, the override logic 108 may be implemented with the functionality to restrict other electronic devices (e.g., 104) from communicating with its electronic device (e.g., 106) when its electronic device is currently experiencing a point of failure (or operational problem). In this way, the override logic 108 implements a communication "fence" around its disabled electronic device (e.g., 106).

The override logic 108 can be implemented with the functionality to automatically activate itself when a point of failure (or problem) is detected that it can compensate or provide a work-around for. It is noted that the override logic 108 can be utilized to test the behavior of system 100 once it has been deployed. For example, the override logic 108 can be activated in particular ways to see how system 100 operates outside its normal operating conditions. Override logic similar to the override logic 108 can be implemented as part of (or in association with) any number of electronic devices (e.g., 104) and/or any number of items (e.g., 102). The override logic 108 can be implemented such that it operates in an integrated way (e.g., non-destructive) with the behavior of system 100. Additionally, the override logic 108 can be implemented to enable system 100 to be brought up from one or more points of failure in a degraded or full functioning mode.

The override logic 108 can be implemented with critical hardware components of an electronic device (e.g., 106) or an electronic circuit board or item (e.g., 102). As such, the override logic 108 can overwrite (or override) the current component's normal behavior that it is associated with and give control of the component's functions to software (for example) to dictate what its behavior should be. This can include, but is not limited to, overwriting (or overriding) critical input and/or output signal(s) on a chip to overwriting (or overriding) an internal logic state. Additionally, the override logic 108 can be implemented to overwrite (or override) a single command execution, or a set of command executions.

The override logic 108 of FIG. 1 can be implemented to provide a hardware work-around for software (not shown) that has one or more points of failure (or operational problems). For example, if the software operating on electronic device 106 did have a point of failure that was detected, the override logic 108 can be implemented as an intermediary so that once activated, it receives commands from the disabled software intended for some other device and ignores (or suppresses) them. Furthermore, the override logic 108 can then output one or more signals to the intended device to cause it to perform in a predictable manner. Alternatively, once activated, the override logic 108 can be implemented to ignore programming from software except through a particular communication path.

Item 102 is communicatively coupled with the electronic device 104 via coupling 114. Additionally, item 102 is communicatively coupled with the electronic device 106 via coupling 118. The electronic device 106 is communicatively coupled with the monitoring system 112 via coupling 134. Within electronic device 106, an input to the device logic 110 is communicatively coupled with the bi-directional communication coupling 116 via communication coupling 122. Furthermore, an input of the override logic 108 is communicatively coupled with the bi-directional communication coupling 116 via communication coupling 120. An output of the override logic 108 is coupled with an input of the device logic 110 via communication coupling 124. It is understood that the override logic 108 is shown within (or internal to) the electronic device 106, but it can also be implemented external to electronic device 106. The electronic devices 104 and 106 are communicatively coupled together via the bi-directional communication coupling 116 when it is properly operating.

Furthermore, the override logic 108 of FIG. 1 can be implemented anywhere within the electronic device 106. An output of the device logic 110 is coupled with item 102 via communication coupling 118. The monitoring system 112 is communicatively coupled with the override logic 108 via coupling 134. It is noted that the monitoring system 112 can be coupled with the electronic device 106 and/or override logic 108 utilizing wired and/or wireless communication technology. The monitoring system 112 is not limited to be coupled with override logic 108 of electronic device 106. For instance, the monitoring system 112 is also well suited to be coupled with override logic (e.g., 108) that may be implemented with electronic device 104 and/or item 102 while being coupled with the override logic 108 of electronic device 106. Even though not shown, the monitoring system 112 can also be coupled with electronic device 104 and/or item 102 in order to monitor their functionality and/or to activate override logic (e.g., similar to 108) that may be associated with each one. Alternatively, electronic device 104 and item 102 can each have a monitoring system similar to monitoring system 112 coupled with it.

Moreover, monitoring system 112 can be implemented as part of (or incorporated with) electronic device 106. Additionally, electronic device 104 and item 102 can each be implemented with (or incorporated with) an independent monitoring system similar to monitoring system 112. System 100 could be implemented with a hierarchy of monitoring systems similar to monitoring system 112. For example, a monitoring system may be implemented to supervise over monitoring system 112 and any monitoring systems associated with electronic device 104 and/or item 102. Also, one or more monitoring systems could be implemented within system 100 to monitor hardware signals while a higher level monitoring system(s) could manage higher level functions. Each monitoring system could recommend what type of override function or operation to activate.

Where and how monitoring systems (e.g., 112) are implemented may depend on location. For example, if each component to be associated with override logic (e.g., 108) is located on the same circuit board or card, it may be preferable to implement one monitoring system that monitors all the override logic and/or components. Alternatively, if each component to be associated with override logic (e.g., 108) is located on different circuit boards and/or cards, it may be desirable to implement one or more monitoring systems on each circuit board or card.

System 100 can be implemented in a wide variety of ways. For example, system 100 can include a greater number of electronic devices similar to the electronic device 104 and a greater number of electronic devices similar to the electronic device 106. Additionally, system 100 can include a greater number of items similar to item 102 and a greater number of monitoring systems similar to monitoring system 112.

Within FIG. 1, item 102 can be implemented in a wide variety of ways in accordance with the present embodiment. For example, item 102 may be implemented as, but is not limited to, a memory device, an arbitration device, a clock generator, a traffic chip, and the like. Item 102 may be coupled with, but is not limited to, share memory resources, one or more shared buses, one or more devices for generating messages to the outside world, and/or any type of shared electronic component. The override hardware logic 108 can be implemented in diverse ways in accordance with the present embodiment. For example, override logic 108 can be implemented as, but is not limited to, one or more integrated circuits (ICs), one or more state machines, and the like. The electronic devices 104 and 106 can each be implemented in a wide variety of ways. For example, electronic device 104 and 106 can each be implemented as, but is not limited to, a processor card (e.g., 602) of a network communication switch or router (e.g., 600), a line card (e.g., 604, 606 or 608) of a network communication switch or router, an ASIC of a processor card or line card of a network switch or router, an IC of a processor card or line card of a network switch or router, a FPGA of a processor card or line card of a network switch or router, an IC, an ASIC, a FPGA, or any type of electronic device. The monitoring system 112 can be implemented as, but is not limited to, electronic hardware, software, and/or a computer system.

Figure 2:
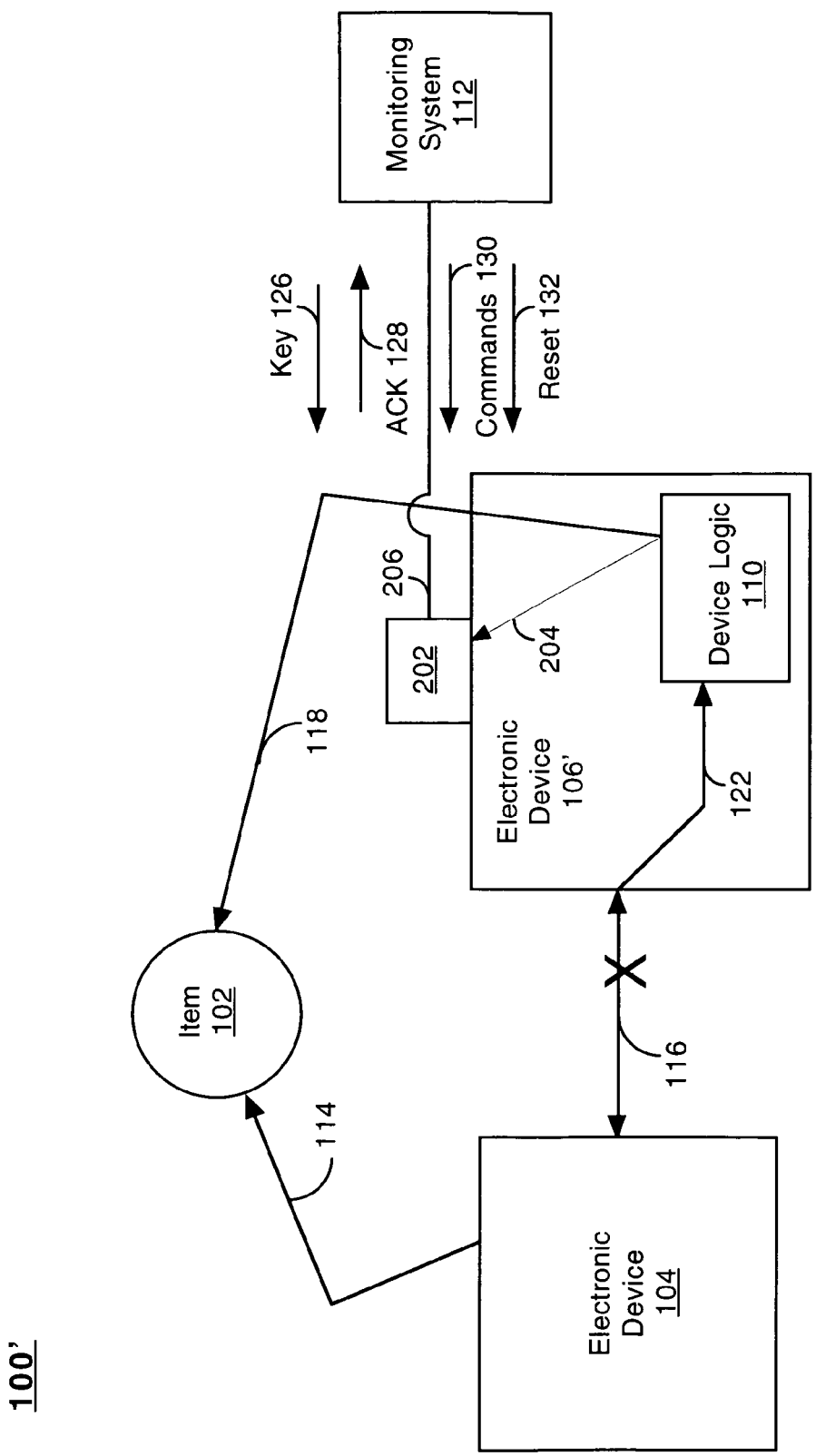
FIG. 2 is a block diagram of an exemplary system in accordance with another embodiment of the invention that enables an electronic device to be controlled in response to an operational failure associated with the system.

FIG. 2 is a block diagram of an exemplary system 100' in accordance with an embodiment of the invention that enables an electronic device (e.g., 106') to be controlled in response to an operational failure associated with system 100'. For example, when a point of failure or problem occurs that is associated with system 100', an electronic device (e.g., 106') may be remotely controlled in order to respond in some manner to the point of failure and thereby enable system 100' to continue operating. Therefore, the present embodiment dramatically decreases the mean time to recover of system 100' and thus provides increased availability of system 100' without requiring a technician (or a person) to be onsite to resolve the problem.

It is noted that system 100' can operate in a manner similar to system 100 described herein within with reference to FIG. 1. However, the electronic device 106' of FIG. 2 is associated with an override hardware logic 202 that is external to the electronic device 106'. It is appreciated that the override logic 202 can also be implemented anywhere within (or internal to) the electronic device 106'. The different operations of system 100' associated with the electronic device 106' and the override logic 202 will be discussed.

Within FIG. 2, in order to respond to one or more points of failure within system 100', each point of failure is first detected which can be performed in a wide variety of ways. The detection of any points of failure within system 100' can be implemented in any manner similar to that described herein. The present embodiment is not limited in the manner that it detects points of failure (or operational problems) associated with system 100'. Once any point of failure (or problem) has been detected that is associated with system 100', a determination can be made automatically or by a person as to whether any override logic (e.g., 202) exists within system 100' that can be activated to compensate for (or work-around) the detected point of failure. This determination can be performed by, but is not limited to, the optional monitoring system 112, electronic device 104, electronic device 106', item 102, and/or override logic 202. If no existing override logic (e.g., 202) can compensate for the detected point of failure, a technician (or person) can be sent out to correct (or repair) the point of failure. However, if existing override logic (e.g., 202) can compensate or provide a work-around for the detected point of failure, that override logic can be activated.

For example, given that override logic 202 of FIG. 2 can compensate (or provide a work-around) for the inoperative bi-directional communication coupling 116, the monitoring system 112 can automatically (or be manually activated to) transmit or send electronic key 126 to the override hardware logic 202 via coupling 206 to initiate its activation. Upon receipt of electronic key 126, override logic 202 can optionally transmit (or send) electronic acknowledge (ACK) signal 128 to the monitoring system 112 via coupling 206 indicating it received key 126. The monitoring system 112 can automatically (or manually be activated by a person to) transmit or send one or more electronic commands 130 to the override logic 202 via coupling 206 directing it to perform one or more operations (or functions) to compensate (or provide a work-around) for the inoperative communication coupling 116. For instance, commands 130 may instruct override logic 202 to suppress any communication that device logic 110 (of the electronic device 106') transmits to item 102 via coupling 118. In this manner, the device logic 110 of electronic device 106' is restricted from communicating with item 102 while the electronic device 104 is allowed to communicate with item 102 as desired. Therefore, the electronic devices 104 and 106' are restricted from communicating with item 102 simultaneously (or concurrently). It is understood that monitoring system 112 can transmit electronic key 126 and commands 130 in any manner similar to that described herein.

The commands 130 of FIG. 2 can direct override logic 202 to deactivate coupling 118 while activating coupling 204 thereby diverting to the override logic 202 any output communication of the device logic 110 (of electronic device 106') intended for item 102. Therefore, the electronic device 106' is unable to communicate with item 102 via coupling 118. Within this situation, the electronic device 106' is restricted from operating in its "normal" manner. However, system 100' maintains its operational integrity until a person (or technician) is able to locate and fix the point of failure (or problem)

associated the inoperative bi-directional communication coupling 116. It is noted that the functionality of override logic 202 is based on the fact that communication with item 102 is a non-feedback loop. However, if item 102 did respond to communication from electronic device 106', the override logic 202 can be modified to also suppress communication transmitted by item 102 intended for electronic device 106'. The override logic 202 can be implemented to simultaneously (or concurrently) suppress, but is not limited to, one or more inputs, outputs, pins, and/or signals.

A determination can be made automatically (or by a person) as to whether or not to have the override logic 202 continue performing operations (or functions) associated with commands 130. For example, if the point of failure of system 100' continues to exist, the determination may result in having the override hardware logic 202 continue to performing as described herein. However, if the point of failure no longer exists (e.g., a technician or person fixed it), the monitoring system 112 may transmit one or more reset signals 132 to the override logic 202 via coupling 206 causing it to become inactive or dormant. Therefore, within the example of system 100', as part of its shutdown procedure, the override logic 202 can deactivate coupling 204 and activate coupling 118. Consequently, system 100' is able to operate in its "normal" manner.

Within system 100', it is understood that the "X" on the bi-directional communication coupling 116 is not limited to indicating that coupling 116 is inoperative. For instance, the "X" on the bi-directional communication coupling 116 can instead indicate that electronic devices 104 and 106' are not communicating properly. For example, electronic devices 104 and 106' may not be communicating properly in any manner similar to that described herein, but is not limited to such.

Within FIG. 2, item 102 is communicatively coupled with the electronic device 104 via coupling 114 and with the electronic device 106' via coupling 118. The electronic device 106' may be communicatively coupled (not shown) with the monitoring system 112. Within the electronic device 106', an input to the device logic 110 is communicatively coupled with the bi-directional communication coupling 116 via communication coupling 122. An output of the device logic 110 is coupled with item 102 via communication coupling 118. Additionally, the output of device logic 110 is also coupled with an input of the override logic 202 via coupling 204. The monitoring system 112 is communicatively coupled with the override logic 202 via coupling 206. It is noted that the monitoring system 112 can be coupled with the electronic device 106' and/or the override logic 202 utilizing wired and/or wireless communication technology. Even though not shown, monitoring system 112 can also be coupled to electronic device 104 and/or item 102 in order to monitor each device's functionality and/or to activate override logic (e.g., similar to 202 and/or 108) that may be associated with it. The electronic devices 104 and 106' are communicatively coupled together via the bi-directional communication coupling 116 when it is properly operating.

System 100' can be implemented in a wide variety of ways. For example, system 100' can include a greater number of electronic devices similar to the electronic device 104 and a greater number of electronic devices similar to the electronic device 106'. Additionally, system 100' can include a greater number of items similar to item 102 and a greater number of monitoring systems similar to monitoring system 112.

Within FIG. 2, it is understood that item 102 can be implemented in any manner similar to that described herein, but is not limited to such. The override hardware logic 202 can be implemented in a wide variety of ways in accordance with the present embodiment. For example, the override logic 202 can be implemented as, but is not limited to, one or more integrated circuitry, one or more state machines, and the like. Override hardware logic 202 can be implemented in any manner similar to that described herein with reference to the override hardware logic 108, but is not limited to such. The electronic device 106' can be implemented in any manner similar to that described herein with reference to the electronic device 106, but is not limited to such.

Figure 3:
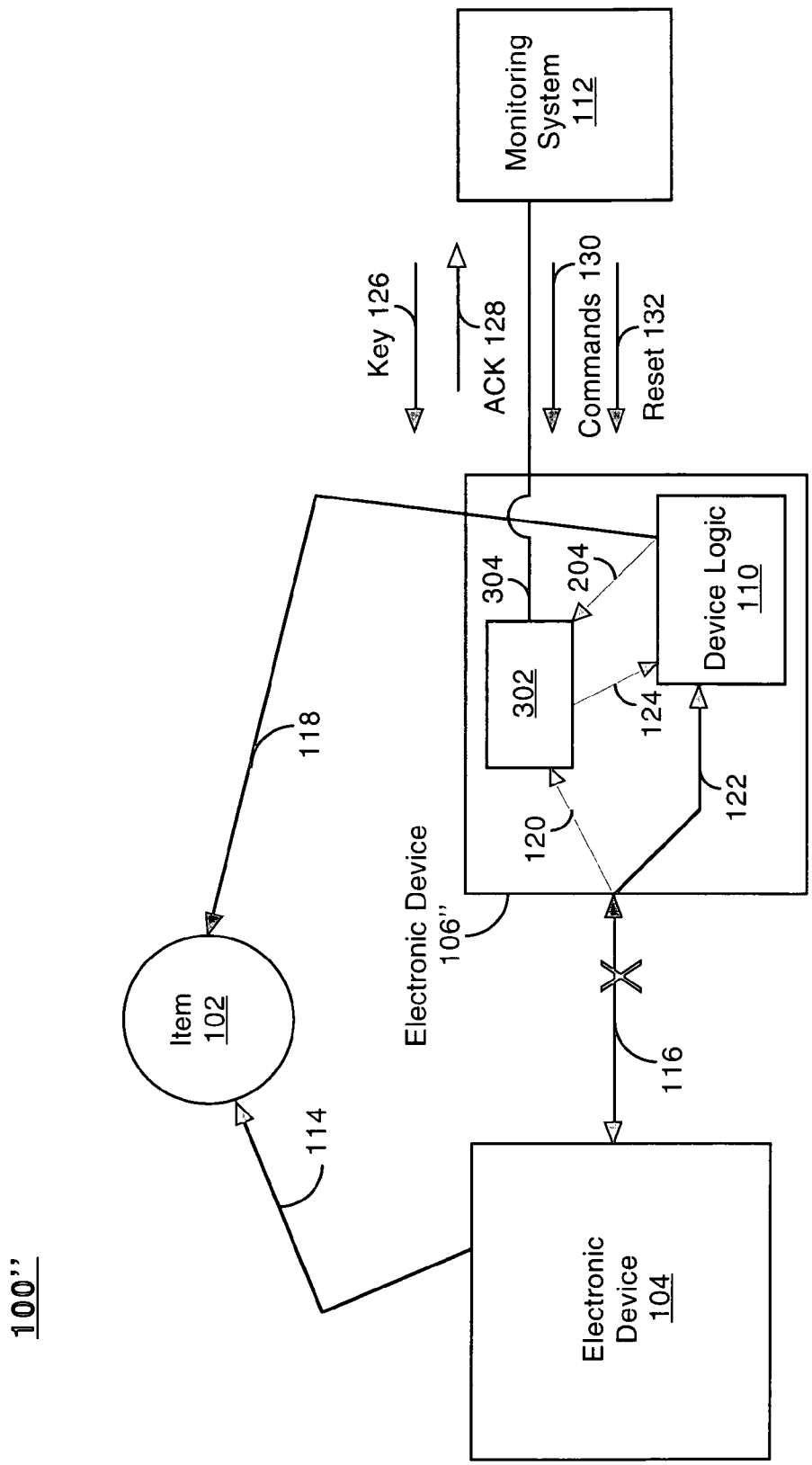
FIG. 3 is a block diagram of an exemplary system in accordance with yet another embodiment of the invention that enables an electronic device to be controlled in response to an operational failure associated with the system.

FIG. 3 is a block diagram of an exemplary system 100" in accordance with an embodiment of the invention that enables an electronic device (e.g., 106") to be controlled in response to an operational failure associated with system 100". For example, when a point of failure or problem occurs that is associated with system 100", an electronic device (e.g., 106") may be remotely controlled in order to respond in some manner to the point of failure and thereby enable system 100" to continue operating. As such, the present embodiment dramatically reduces the mean time to recover of system 100" and thus enlarges the availability of system 100" without requiring a technician (or a person) to be onsite to resolve the problem.

It is noted that system 100" can operate in a manner similar to system 100 (of FIG. 1) and/or system 100' (of FIG. 2) both described herein. However, the electronic device 106" of FIG. 3 is associated with an override hardware logic 302 that is internal to the electronic device 106". The override logic 302 can be implemented anywhere within the electronic device 106". However, it is appreciated that the override logic 302 can also be implemented external to the electronic device 106". The different operations of system 100" associated with the electronic device 106" and the override logic 302 will be discussed.

Within FIG. 3, in order to respond to one or more points of failure within system 100", each point of failure is detected which can be performed in a wide variety of ways. The detection of any points of failure within system 100" can be implemented in any manner similar to that described herein. The present embodiment is not limited in the manner that it detects points of failure (or operational problems) associated with system 100". Once any point of failure (or problem) has been detected that is associated with system 100", a determination can be made automatically or by a person as to whether any override logic (e.g., 302) exists within system 100" that can be activated to work-around (or compensate for) the detected point of failure. This determination can be performed by, but is not limited to, the optional monitoring system 112, electronic device 104, electronic device 106", item 102, and/or override logic 302. If no existing override logic (e.g., 302) can compensate for the detected point of failure, a technician (or person) can be sent to correct the point of failure. However, if existing override logic (e.g., 302) can provide a work-around (or compensate) for the detected point of failure, that override logic can be activated.

For example, given that override logic 302 of FIG. 3 can compensate (or provide a work-around) for the inoperative bi-directional communication coupling 116, the monitoring system 112 can automatically (or be manually activated to) transmit or send electronic key 126 to override hardware logic 302 via coupling 304 to initiate its activation. Upon receipt of electronic key 126, override logic 302 can optionally transmit (or send) electronic acknowledge (ACK) signal 128 to the monitoring system 112 via coupling 304 indicating reception of key 126. The monitoring system 112 can automatically (or be manually activated to) transmit or send one or more electronic commands 130 to override logic 302 via coupling 304 directing it to perform one or more operations (or functions) to compensate (or provide a work-around) for the inoperative communication coupling 116.

For instance, the commands 130 may instruct override logic 302 to suppress any communication that device logic 110 (of the electronic device 106") transmits to item 302 via coupling 118. In this manner, the device logic 110 of electronic device 106" is restricted from communicating with item 102 while the electronic device 104 is allowed to communicate with item 102 as desired. Alternatively, the commands 130 of FIG. 3 may instruct override logic 302 to cause device logic 110 (of the electronic device 106") to "believe" that the electronic device 104 is outputting a continuous access signal (e.g., logical high voltage signal) indicating that it is communicating with item 102. As such, the device logic 110 of electronic device 106" is artificially suppressed from trying to communicate with item 102 while the electronic device 104 is allowed to communicate with item 102 as desired. Therefore, the electronic devices 104 and 106" are restricted from communicating with item 102 simultaneously (or concurrently). It is understood that monitoring system 112 can transmit electronic key 126 and commands 130 in any manner similar to that described herein.

Within FIG. 3, the override logic 302 can perform the functions of the override logic 108 (FIG. 1) and/or the functions of the override logic 202 (FIG. 2) as described herein. For example, if one or more detected points of failure can be compensated for (or worked-around) by suppressing the electronic device 106" from outputting via coupling 118, the override logic 302 can be directed automatically or manually by the monitoring system 112 to do so. Specifically, the commands 130 automatically or manually issued by monitoring system 112 of FIG. 3 can direct override logic 302 to deactivate coupling 118 while activating coupling 204 thereby diverting to the override logic 302 any output communication of the device logic 110 (of electronic device 106") intended for item 102. Therefore, the electronic device 106" is unable to communicate with item 102 via coupling 118. It is noted that the functionality of override logic 302 is based on communication with item 102 that is a non-feedback loop. However, if item 102 did respond to communication from electronic device 106", the override logic 302 can be modified to also suppress communication transmitted by item 102 intended for electronic device 106".

Within another example, if one or more detected points of failure can be compensated for (or worked-around) by diverting undesirable output from the bi-directional communication coupling 116 away from the device logic 110 and providing it desirable input, the override logic 302 can be directed automatically or manually to do so by the monitoring system 112. Specifically, the commands 130 issued automatically or manually by monitoring system 112 of FIG. 3 can direct the override logic 302 to deactivate coupling 122 and activate coupling 120 thereby diverting via coupling 120 any incoming signal output from the bi-directional communication coupling 116 away from device logic 110. Additionally, the commands 130 can direct the override logic 302 to output a specific signal (e.g., logical high voltage) to the device logic 110 via coupling 124 to produce a desired behavior from the electronic device 106". For example, the desired behavior of restricting the electronic device 106" from trying to communicate with item 102 via coupling 118.

Additionally, within FIG. 3, if one or more detected points of failure can be compensated for (or worked-around) by suppressing the electronic device 106" from outputting communication via coupling 118 and also by diverting undesirable output from the bi-directional communication coupling 116 away from the device logic 110 and providing it a desirable input, the override logic 302 can be directed automatically or manually to do so by the monitoring system 112 in any manner similar to that described herein.

A determination can be made automatically or by a person as to whether or not to have the override logic 302 continue performing operations (or functions) associated with commands 130. For example, if the point of failure of system 100" continues to exist, the determination may result in the override hardware logic 302 continuing to perform as described herein. However, if the point of failure no longer exists, the monitoring system 112 may automatically or be manually activated to transmit one or more reset signals 132 to the override logic 302 via coupling 304 causing it to become inactive or dormant. As part of its shutdown procedure, the override logic 302 may perform different operations based on the operations (or functions) it performed in response to receiving commands 130. For example, as part of its shutdown procedure, the override logic 302 can deactivate coupling 204 and activate coupling 118. Alternatively, as part of its shutdown procedure, the override logic 302 can cause the bi-directional communication coupling 116 to be coupled with the device logic 110 via coupling 122 while deactivating couplings 120 and 124.

Within another embodiment, as part of its shutdown procedure, the override logic 302 can perform a combination of the previously described shutdown operations. Once the shutdown procedure is completed by the override logic 302, system 100" is able to operate in its "normal" manner.

Within system 100", it is appreciated that the "X" on the bi-directional communication coupling 116 is not limited to indicating that coupling 116 is inoperative. For instance, the "X" on the communication coupling 116 can instead indicate that electronic devices 104 and 106" are not communicating properly. For example, electronic devices 104 and 106" may not be communicating properly in any manner similar to that described herein, but is not limited to such.

Within FIG. 3, item 102 is communicatively coupled with the electronic device 104 via coupling 114 and with the electronic device 106" via coupling 118. The electronic device 106" is communicatively coupled with the monitoring system 112 via coupling 304. Within the electronic device 106", an input of the device logic 110 is communicatively coupled with the bi-directional communication coupling 116 via communication coupling 122. An input of the override logic 302 is communicatively coupled with the bi-directional communication coupling 116 via coupling 120. Another input of device logic 110 is coupled to an output of override logic 302 via coupling 124. An output of the device logic 110 is coupled with item 102 via communication coupling 118. Additionally, the output of device logic 110 is also coupled with another input of the override logic 302 via coupling 204. Monitoring system 112 is communicatively coupled with the override logic 302 via coupling 304. The monitoring system 112 can be coupled with the electronic device 106" and/or the override logic 302 utilizing wired and/or wireless communication technology. Even though not shown, monitoring system 112 can also be coupled to electronic device 104 and/or item 102 in order to monitor each device's functionality and/or to activate override logic (e.g., similar to 302, 202 and/or 108) that may be associated with it. Electronic devices 104 and 106" are communicatively coupled together via the bi-directional communication coupling 116 when it is properly operating.

System 100" can be implemented in a wide variety of ways. For example, system 100" can include a greater number of electronic devices similar to the electronic device 104 and a greater number of electronic devices similar to the electronic device 106". Furthermore, system 100" can include a greater number of items similar to item 102 and a greater number of monitoring systems similar to monitoring system 112.

Within FIG. 3, it is understood that item 102 can be implemented in any manner similar to that described herein, but is not limited to such. The override hardware logic 302 can be implemented in a wide variety of ways in accordance with the present embodiment. For example, the override logic 302 can be implemented as, but is not limited to, one or more integrated circuits, one or more state machines, and the like. Override hardware logic 302 can be implemented in any manner similar to that described herein with reference to the override hardware logic 108 and/or 202, but is not limited to such. The electronic device 106" can be implemented in any manner similar to that described herein with reference to the electronic device 106, but is not limited to such.

It is noted that system 100 of FIG. 1, system 100' of FIG. 2, and system 100" of FIG. 3 can each be implemented without monitoring system 112. Alternatively, override logic 108, 202, and 302 can each be implemented to include the functionality of monitoring system 112.

Figure 4:
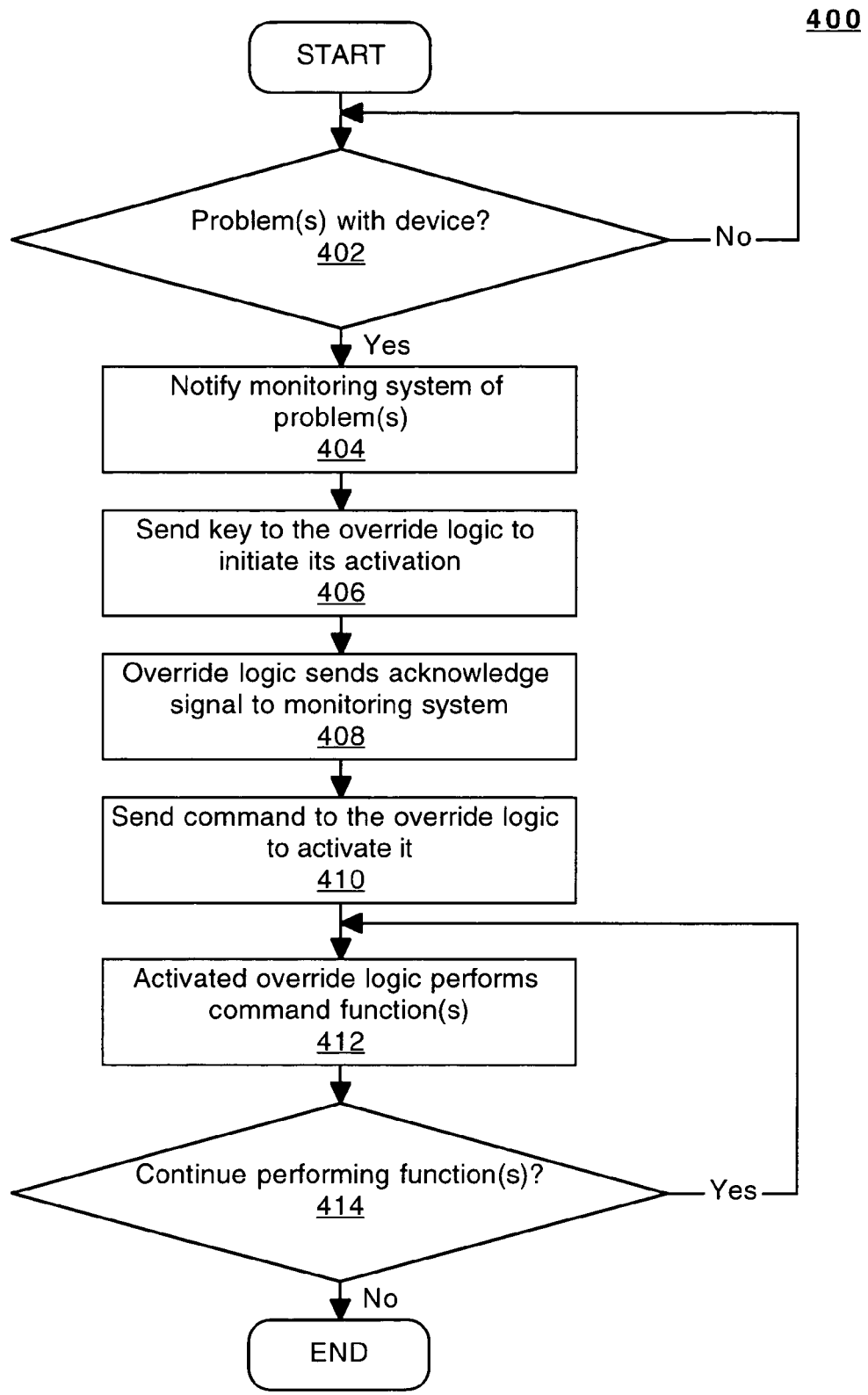
FIG. 4 is a flowchart of a method in accordance with an embodiment of the invention for enabling an electronic device to be controlled in some manner after a functional failure.

FIG. 4 is a flowchart 400 of operations performed in accordance with an embodiment of the invention for enabling an electronic device to be controlled in some manner after a functional failure. Flowchart 400 includes exemplary processes of embodiments of the invention which can be carried out by a processor(s) and electrical components under the control of electronic device readable and executable instructions (or code), e.g., software. The electronic device readable and executable instructions (or code) may reside, for example, in data storage features such as volatile memory, non-volatile memory and/or mass data storage that is usable by an electronic device. However, the electronic device readable and executable instructions (or code) may reside in any type of electronic device readable medium. Although specific operations are disclosed in flowchart 400, such operations are exemplary. That is, the present embodiment is well suited to performing various other operations or variations of the operations recited in FIG. 4. It is noted that the operations of flowchart 400 can be performed by software, by firmware, by hardware or by any combination thereof.

The present embodiment provides a method for enabling an electronic device (e.g., 106) to be controlled in some manner after a functional failure. Specifically, a determination is made as to whether any functional failures or problems have occurred associated with the electronic device. If not, that determination is continually repeated. However, if any functional failures or problems have occurred, the electronic device notifies a monitoring system. In response to receiving the notification, the monitoring system sends one or more electronic keys to override logic associated with the electronic device in order to initiate its activation. In response to receiving the key, the override logic can optionally send an acknowledge signal to the monitoring system indicating its reception of the key. The monitoring system sends one or more commands associated with one or more functions that the override logic is to perform in response to the reported failures or problems. In response to receiving the command(s), the override logic performs the corresponding function(s). A determination is made as to whether to have the override logic continue performing the command function(s). If so, the override logic continues performing the command function(s). However, if it is determined that the override logic is to discontinue performing the command function(s), process 400 is exited. In this manner, the present embodiment provides a method for enabling an electronic device to be controlled in some manner after a functional failure.

At operation 402 of FIG. 4, a determination can be made automatically (or manually by a person) as to whether one or more functional failures and/or problems have occurred associated with an electronic device (e.g., 104, 106, and/or 102). If it is determined at operation 402 that no problems or functional failures have occurred, process 400 proceeds to the beginning of operation 402 in order to repeat it. However, if it is determined at operation 402 that one or more functional failures or problems have occurred, process 400 proceeds to operation 404. It is noted that the determination at operation 402 may be performed in a wide variety of ways. For example, the electronic device may be able to automatically detect functional failures and/or problems. Alternatively, the electronic device may periodically run a diagnostic check of its different functionalities to determine whether they are operating properly. During this diagnostic check, the electronic device may detect functional failures and/or problems. Furthermore, the electronic device may be informed by another device that it has one or more functional failures and/or problems. It is noted that the present embodiment is not limited to these several examples. The detection of functional failures and/or problems at operation 402 can be performed in any manner similar to that described herein, but is not limited to such.

At operation 404, in response to the detection of any functional failures and/or problems, the electronic device notifies a monitoring system (e.g., 112). It is noted that the electronic device can notify the monitoring system in a wide variety of ways. For example, the electronic device can transmit a diagnostic report to the monitoring system that includes a specific listing of any problems and/or functional failures associated with it. Alternatively, the electronic device can transmit a listing of symptoms associated with problems and/or functional failures it is experiencing. It is understood that the monitoring system of the present embodiment may be implemented in diverse ways. For example, the monitoring system may be implemented as, but is not limited to, electronic hardware, software, a computer system, and/or a portable computing device, that can be communicatively coupled to the electronic device.

At operation 406 of FIG. 4, in response to receiving the problem notification, the monitoring system can automatically (or be manually activated to) send (or transmit) one or more electronic keys (e.g., 126) to the override or backup logic (e.g., 108, 202 and/or 302) associated with the electronic device in order to initiate its activation. It is appreciated that the override logic can include one or more functions (or portions) that can each be activated by one or more electronic keys and utilized for responding to the reported problems and/or functional failures of the electronic device. It is understood that the electronic keys of operation 406 can be implemented in a wide variety of ways. For example, a predefined number of electronic keys may be transmitted to the override logic at predefined time intervals in order to activate it. Furthermore, different electronic keys may be transmitted to activate different functionality or different regions of the override hardware logic. Additionally, the electronic key at operation 406 can be implemented with any type of electronic code sequence. It is noted that operation 406 can be implemented in any manner similar to that described herein, but is not limited to such. By utilizing an electronic key to initiate the activation of the override logic, there is less chance of the override logic being accidentally activated.

At operation 408, in response to receiving the electronic key, the override logic may optionally transmit an electronic acknowledge signal (e.g., 128) to the monitoring system thereby indicating its reception of the key. It is appreciated that the operation 408 can be implemented in diverse ways in accordance with the present embodiment. For example, the acknowledge signal can include any predefined electronic code sequence. Alternatively, the override logic (e.g., 108, 202, and/or 302) can be implemented such that it knows whether or not to send an acknowledge signal based on the identity, name, and/or type of electronic key(s) it receives. It is noted that if operation 408 is not implemented as part of process 400, operation 410 would follow operation 406.

At operation 410 of FIG. 4, the monitoring system can automatically (or be manually activated to) transmit to the override logic one or more commands (e.g., 130) that correspond to one or more functions that are to be performed by the override hardware logic. It is understood that the performance of the desired function(s) by the override hardware logic is part of an effort to solve and/or lessen the affect of the electronic device's detected problems and/or functional failures. In this manner, the override logic may be thought of as a temporary "work-around" of the detected problems and/or functional failures. As such, the electronic device is not rendered useless, inoperative and/or non-responsive by problems and/or functional failures. Instead, the electronic device can be remotely serviced so that even if it cannot fully function, it can provide desirable functionality as opposed to detrimental functionality. It is noted that one or more commands of operation 410 can activate a particular portion (or part) of the override logic which performs an operation (or function) that compensates for (or works-around) the detected problems and/or functional failures associated with the electronic device.

At operation 412, in response to receiving the one or more commands, the override hardware logic performs the one or more corresponding functions. It is noted that the performance of the one or more functions at operation 412 by the activated override logic can be implemented in a wide variety of ways. For example, the override logic may continuously perform a function after receiving its corresponding command. Alternatively, the override logic may just perform a function in response to the existence of a predefined state. It is noted that the override logic may perform a function or operation in any manner similar to that described here, but is not limited to such.

At operation 414 of FIG. 4, a determination can be made automatically or by a person as to whether the override logic should continue performing the command function(s). If it is desirable to have the override logic continue, process 400 proceeds to the beginning of operation 412 in order to continue performing the command function(s). In this manner, the override (or backup) logic is able to perform requested functions for as long as desired or functionally needed. However, if it is determined at operation 414 that the override logic should discontinue performing the command function(s), process 400 is then exited.

Figure 5:
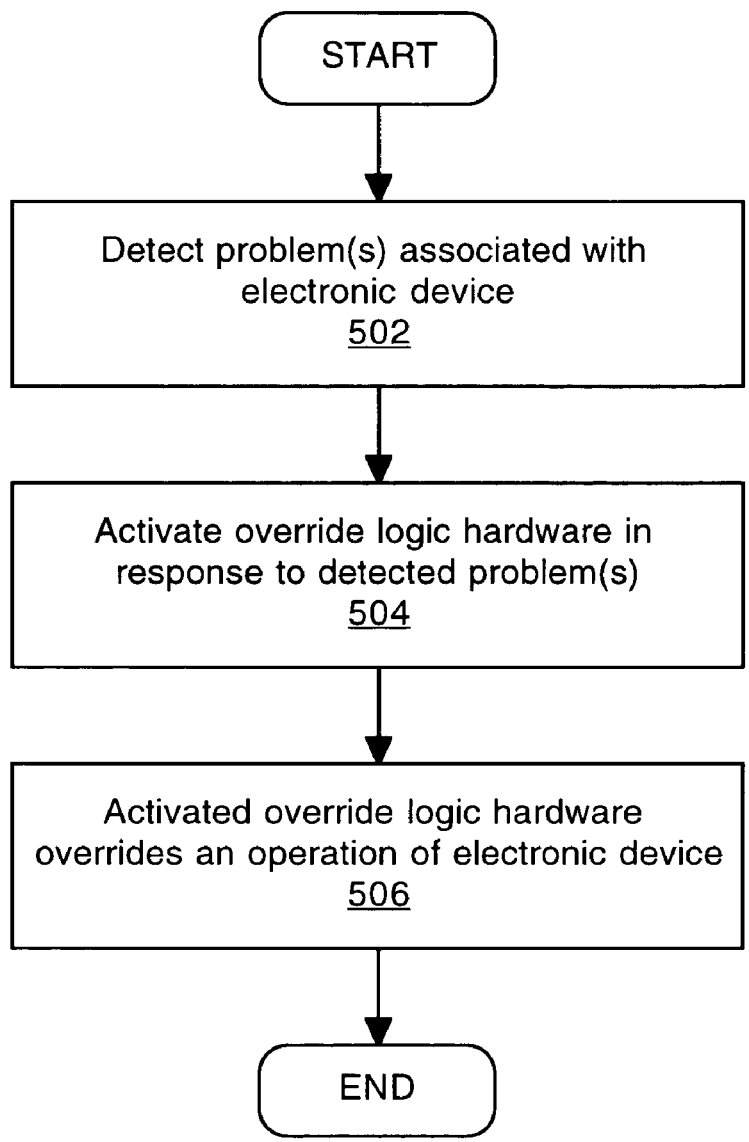
FIG. 5 is a flowchart of a method in accordance with an embodiment of the invention for overriding an operation of an electronic device.

FIG. 5 is a flowchart 500 of operations performed in accordance with an embodiment of the invention for overriding an operation of an electronic device. Flowchart 500 includes exemplary processes of embodiments of the invention which can be carried out by a processor(s) and electrical components under the control of electronic device readable and executable instructions (or code), e.g., software. The electronic device readable and executable instructions (or code) may reside, for example, in data storage features such as volatile memory, non-volatile memory and/or mass data storage that is usable by an electronic device. However, the electronic device readable and executable instructions (or code) may reside in any type of electronic device readable medium. Although specific operations are disclosed in flowchart 500, such operations are exemplary. That is, the present embodiment is well suited to performing various other operations or variations of the operations recited in FIG. 5. It is noted that the operations of flowchart 500 can be performed by software, by firmware, by hardware or by any combination thereof.

The present embodiment provides a method for overriding an operation of an electronic device. Specifically, a problem (or point of failure) is detected that is associated with the electronic device. In response to the problem being detected, an override hardware logic associated with the electronic device is activated. In response to being activated, the override hardware logic overrides the operation of the electronic device in order to compensate for the problem associated with the electronic device.

At operation 502 of FIG. 5, one or more problems (or points of failure) are detected which is associated with an electronic device (e.g., 106). It is noted that the detecting at operation 502 of any problem or point of failure associated with an electronic device can be performed in a wide variety of ways. For example, the problem(s) can be detected automatically and/or manually by a person. Alternatively, the electronic device can automatically detect functional failures and/or problems associated with itself. Furthermore, the electronic device may periodically run a diagnostic check of its different functionalities to determine whether they are all operating properly. During this diagnostic check, the electronic device may detect functional failures and/or problems. Additionally, another device associated with the electronic device can detect one or more functional failures and/or problems associated with the electronic device. Moreover, any problem or point of failure associated with the electronic device can be detected in any manner similar to that described herein, but is not limited to such.

At operation 504, in response to the problem(s) being detected, an override hardware logic (e.g., 108, 202 and/or 302) associated with the electronic device is activated. It is noted that the activation of the override logic at operation 504 can be performed in diverse ways. For example, one or more electronic keys (e.g., 126) can be sent (or transmitted) to the override logic to activate it from a dormant state. Alternatively, one or more electronic commands (e.g., 130) can be sent or transmitted to the override logic to activate it. Furthermore, the activation of the override hardware logic can include activating one or more functions and/or one or more regions of the override hardware logic. Moreover, the override logic can be activated in any manner similar to that described herein, but is not limited to such.

At operation 506 of FIG. 5, in response to being activated, the override hardware logic overrides (or overwrites) the operation of the electronic device in order to compensate (or provide a work-around) for the problem(s) or point(s) of failure associated with the electronic device. It is noted that the override logic can override the operation of the electronic device in a wide variety of ways. For example, the override logic can override the operation of the electronic device by suppressing one or more input signals receivable by the electronic device. Alternatively, the override logic can override the operation of the electronic device by suppressing one or more output signal generated by the electronic device. Furthermore, the override logic can override the operation of the electronic device by generating an output signal causing the electronic device to operate (or react) in a desired manner. Moreover, the override logic can override the operation of the electronic device in any manner similar to that described herein, but is not limited to such.

It is appreciated that process 500 can be implemented to include one or more additional operations that are not shown. For example, process 500 can include the sending (or transmitting) of one or more electronic commands (e.g., 130) to the override hardware logic to initiate (or direct) the overriding of the operation of the electronic device. Alternatively or in addition to, process 500 can include notifying a monitoring system (e.g., 112) of the problem(s) associated with the electronic device, in response to the problem(s) being detected.

Figure 6:
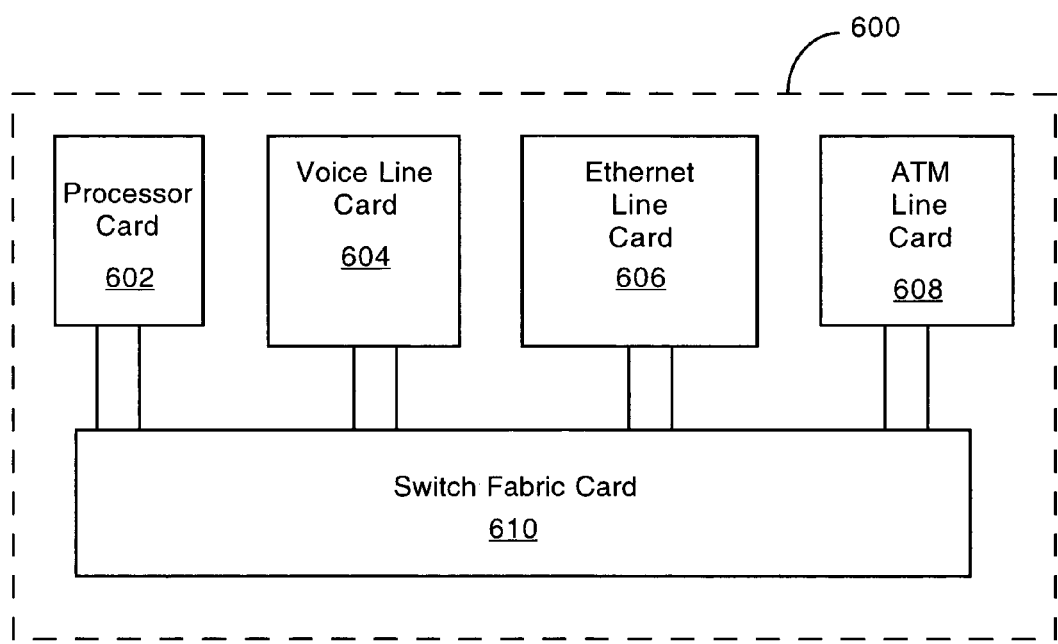
FIG. 6 is a block diagram of an exemplary network communication switch (or router) that may be used in accordance with embodiments of the invention.

FIG. 6 is a block diagram of an exemplary network communication switch (or router) 600 that may be used in accordance with embodiments of the invention. Within the discussions of embodiments in accordance with the invention herein, certain processes and operations were discussed that may be realized, in some embodiments, as a series of instructions or code (e.g., software program) that may reside within readable memory of switch 600 and executed by a processor(s) of switch 600. When executed, the instructions (or code) may cause one or more components of switch 600 to perform specific operations and exhibit specific behavior which are described herein.

Network switch (or router) 600 comprises one or more switch fabric cards (and/or buses) 610 for communicating information, one or more processor cards 602 coupled with switch fabric card(s) 610 for, but not limited to, making centralized decisions related to line cards 604, 606, and 608, along with what to enable, how signals should be driven, and the like. Processor card(s) 602 may include one or more microprocessors or any other type of processor. The switch 600 may also include, but is not limited to, one or more voice line cards 604, one or more Ethernet line cards 604, and one or more Asynchronous Transfer Mode (ATM) line cards 608 coupled with switch fabric card(s) 610 for forwarding data and information between different computers and/or networks. Each voice line card 604 can be implemented in a wide variety of ways. For example, a voice line card 604 can be implemented as, but is not limited to, a time-division multiplexing (TDM) card that can include one or more digital signal processors (DSPs), any type of voice circuit card, and the like. It is noted that network switch (or router) 600 can be implemented with redundant processor cards and line cards for those cards shown. Furthermore, network switch 600 can include any type and any number of cards, line cards, and/or processor cards.

The foregoing descriptions of specific embodiments in accordance with the invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system comprising:
    a network processing device to communicate with at least one electronic resource component shared among multiple network processing devices, the electronic resource component to be shared according to signaling between the network processing devices; and
    an override device, when the signaling indicates the electronic resource component is available to receive communication from the network processing device, to override the communication by the network processing device with the electronic resource component, where the override device is remotely initiated by a monitoring system in response to a failure associated with the signaling between the network processing devices, and where the override device is configured to divert the signaling to be received by the network processing device to the override device or to divert an output signal generated by the network processing device for communication to the electronic resource component to the override device.

2. The system of claim 1, wherein the monitoring system to remotely transmit one or more override commands to the override device when the monitoring system determines the failure associated with the network processing device, the override commands to direct the override device to override communication with the shared electronic resource component.

3. The system of claim 2, wherein the monitoring system to initiate the override device by remotely transmitting at least one override key to the override device, the override key to at least be accompanied by the override commands, or indicate how many override commands the monitoring system will remotely transmit to the override device once the override device acknowledges the override key.

4. The system of claim 1, wherein said monitoring system outputs a defined number of override keys at defined time intervals to initiate activation of the override device.

5. The system of claim 1, wherein the override of the signaling to indicate to the network processing device to not communicate with the electronic resource component.

6. The system of claim 1, wherein said override device to generate an output signal that causes said network processing device to suppress communication to the electronic resource component.

7. The system of claim 1, wherein said network processing device is a processor card of a network switch, a processor card of a network router, a line card of a network switch, a line card of a network router, an application-specific integrated circuit (ASIC) of a processor card or line card of a network switch, an ASIC of a processor card or line card of a network router, an integrated circuit (IC) of a processor card or line card of a network switch, an IC of a processor card or line card of a network router, a field-programmable gate array (FPGA) of a processor card or line card of a network switch, or an FPGA of a processor card or line card of a network router.

8. A method comprising:
    detecting a failure associated with signaling between multiple network processing devices, the multiple network processing devices to share at least one electronic resource component according to the signaling;
    remotely activating an override device associated with a first network processing device, in response to said detecting; and
    overriding communication by the first network processing device with the electronic resource component, wherein the signaling indicates the electronic resource component is available to receive communication from the first network processing device, wherein the overriding comprises diverting the signaling to be received by the first network processing device to the override device or diverting an output signal generated by the first network processing device for communication to the electronic resource component to the override device.

9. The method as described in claim 8, further comprising:
remotely transmitting one or more override commands to an override device in response to the detecting; and
overriding the communication by the first network processing device with the electronic resource component responsive to the override commands.

10. The method as described in claim 9, further comprising:
remotely transmitting at least one override key to the override device, the override key to at least be accompanied by the override commands, or indicate how many override commands will be remotely transmitted to the override device once the override device acknowledges the override key.

11. The method as described in claim 8, further comprising:
notifying a monitoring system of said failure associated with said first network processing device, in response to said detecting said failure.

12. The method as described in claim 8, wherein said diverting of the signaling to be received by said first network processing device overrides communication by the first network processing device with the electronic resource component.

13. The method as described in claim 8, wherein said diverting of the output signal generated by said first network processing device for communication to the electronic resource component overrides communication by the first network processing device with the electronic resource component.

14. The method as described in claim 8, wherein said overriding comprises generating an output signal causing said first network processing device to suppress communication to the electronic resource component.

15. The method as described in claim 8, wherein said activating said override device activates a function or a region of said override hardware logic.

16. The method of claim 8, wherein said network processing device is a processor card of a network switch, a processor card of a network router, a line card of a network switch, a line card of a network router, an application-specific integrated circuit (ASIC) of a processor card or line card of a network switch, an ASIC of a processor card or line card of a network router, an integrated circuit (IC) of a processor card or line card of a network switch, an IC of a processor card or line card of a network router, a field-programmable gate array (FPGA) of a processor card or line card of a network switch, or an FPGA of a processor card or line card of a network router.

17. An electronic device readable storage medium having readable code embodied therein for causing a system to perform a method comprising:
detecting a failure associated with signaling between multiple network processing devices, the multiple network processing devices to share at least one electronic resource component according to the signaling;
remotely activating an override device associated with a first network processing device, in response to said detecting; and
directing said override device to override communication by the first network processing device with the electronic resource component responsive to the remote activation, where the signaling indicates the electronic resource component is available to receive communication from the first network processing device, where the directing the override device comprises diverting the signaling to be received by the first network processing device to the override device or diverting an output signal generated by the first network processing device for communication to the electronic resource component to the override device.

18. The electronic device readable medium of claim 17, further comprises:
remotely transmitting one or more override commands to an override device in response to the detecting; and
overriding the communication by the first network processing device with the electronic resource component responsive to the override commands.

19. The electronic device readable medium of claim 18, further comprises:
remotely transmitting at least one override key to the override device, the override key to at least be accompanied by the override commands, or indicate how many override commands will be remotely transmitted to the override device once the override device acknowledges the override key.

20. The electronic device readable medium of claim 17, wherein the diverting of the signaling to be received by the first network processing device overrides communication by the first network processing device with the electronic resource component.

21. The electronic device readable medium of claim 17, wherein the diverting of the output signal generated by the first network processing device for communication to the electronic resource component overrides communication by the first network processing device with the electronic resource component.

22. The electronic device readable medium of claim 17, wherein said directing said override device comprises generating an output signal causing said first network processing device to suppress communication to the electronic resource component.

23. The electronic device readable medium of claim 17, wherein said activating said override device comprises activating a function or a region of said override hardware logic.

24. A system comprising:
means for detecting a failure associated with signaling between multiple network processing devices, the multiple network processing devices to share at least one electronic resource component according to the signaling;
means for remotely activating an override device associated with a first network processing device, in response to said detecting; and
means for directing said override device to override communication by the first network processing device with the electronic resource component responsive to the remote activation, where the signaling indicates the electronic resource component is available to receive communication from the first network processing device, wherein said means for directing the override device comprises at least one of means for diverting the signaling to be received by the first network processing device to the override device or means for diverting an output signal generated by the first network processing device for communication to the electronic resource component to the override device.

25. The system of claim 24, further comprises:
means for remotely transmitting one or more override commands to an override device in response to the detecting; and means for overriding the communication by the first network processing device with the electronic resource component responsive to the override commands.

26. The system of claim 25, further comprises:
means for remotely transmitting at least one override key to the override device, the override key to at least be accompanied by the override commands, or indicate how many override commands will be remotely transmitted to the override device once the override device acknowledges the override key.

27. The system of claim 24, wherein said means for diverting the signaling to be received by the first network processing device overrides communication by the first network processing device with the electronic resource component.

28. The system of claim 25, wherein said means for activating said override device comprises means for activating a function or a region of said override logic.

29. The system of claim 24, wherein said means for diverting the output signal generated by the first network processing device for communication to the electronic resource component overrides communication by the first network processing device with the electronic resource component.

30. The system of claim 24, wherein said means for directing said override device comprises means for generating an output signal causing said first network processing device to suppress communication to the electronic resource component.

* * * * *